US009430244B1

(12) United States Patent
Tennenhaus et al.

(10) Patent No.: US 9,430,244 B1
(45) Date of Patent: Aug. 30, 2016

(54) RUN-TIME CODE PARALLELIZATION USING OUT-OF-ORDER RENAMING WITH PRE-ALLOCATION OF PHYSICAL REGISTERS

(71) Applicant: Centipede Semi Ltd., Netanya (IL)

(72) Inventors: Omri Tennenhaus, Jerusalem (IL); Alberto Mandler, Zichron Yaakov (IL); Noam Mizrahi, Hod Hasharon (IL)

(73) Assignee: CENTIPEDE SEMI LTD., Netanya (IL)

(*) Notice: Subject to any disclaimer, the term of this patent is extended or adjusted under 35 U.S.C. 154(b) by 0 days.

(21) Appl. No.: 14/924,833

(22) Filed: Oct. 28, 2015

(51) Int. Cl.
G06F 9/38 (2006.01)
G06F 9/30 (2006.01)

(52) U.S. Cl.
CPC ........... *G06F 9/384* (2013.01); *G06F 9/30105* (2013.01); *G06F 9/3867* (2013.01)

(58) Field of Classification Search
CPC ...................................................... G06F 9/384
See application file for complete search history.

(56) References Cited

U.S. PATENT DOCUMENTS

| 5,765,016 | A | 6/1998 | Walker | |
|---|---|---|---|---|
| 6,094,716 | A * | 7/2000 | Witt | G06F 9/30032 712/215 |
| 9,135,015 | B1 | 9/2015 | Mizrahi et al. | |
| 9,208,066 | B1 | 12/2015 | Mizrahi et al. | |
| 2015/0277925 | A1* | 10/2015 | Sleiman | G06F 9/3851 712/215 |

OTHER PUBLICATIONS

Sorin et al.,"Register Renaming",ECE 252 / CPS220 Lecture Notes, Dynamic Scheduling I, pp. 31-43, year 2009.
Akkary et al., "Checkpoint Processing and Recovery:Towards Scalable Large Instruction Window Processors", Proceedings of the 36th International Symposium on Microarchitecture, 12 pages, 2003.
Akkary et al.,"Checkpoint Processing and Recovery: An Efficient,Scalable Alternative to Reorder Buffers", IEEE Micro, vol. 23, Issue 6, pp. 11-19, Nov.-Dec. 2003.
Hennessy et al., "Computer Architecture; A Quantitative Approach", 5th edition, MK Series in Computer Architecture and Design, 848 pages, Oct. 25, 2011.
Monreal et al.,"Dynamic Register Renaming Through Virtual-Physical Registers", Journal of Instructions—Level Parallelism, 20 pages, Jan. 2000.
Cristal et al., "Out-of-Order Commit Processors", IEEE Proceedings—Software, pp. 48-59, 4-18 Feb. 14-18, 2004.
Sima, D., "The Design Space of Register Renaming Techniques", IEEE Micro, vol. 20, Issue 5, p. 70-83, Sep. 2000.

(Continued)

*Primary Examiner* — John Lindlof
(74) *Attorney, Agent, or Firm* — D. Kligler IP Services Ltd.

(57) ABSTRACT

A method includes processing a sequence of instructions of program code that are specified using one or more architectural registers, by a hardware-implemented pipeline that renames the architectural registers in the instructions so as to produce operations specified using one or more physical registers. At least first and second segments of the sequence of instructions are selected, wherein the second segment occurs later in the sequence than the first segment. One or more of the architectural registers in the instructions of the second segment are renamed, before completing renaming the architectural registers in the instructions of the first segment, by pre-allocating one or more of the physical registers to one or more of the architectural registers.

28 Claims, 4 Drawing Sheets

(56) References Cited

OTHER PUBLICATIONS

Shen, J., "EE382A Lecture 6: Register Renaming", Department of Electrical Engineering,Stanford University, EE382A, 40 pages, Autumn 2009.

Ubal et al., "The Impact of Out-of-Order Commit in Coarse-Grain, Fine-Grain and Simultaneous Multithreaded Architectures", IEEE International Symposium on Parallel and Distributed Processing,11 pages, Apr. 14-18, 2008.

Tennenhaus et al., U.S. Appl. No. 14/960,385, filed Dec. 6, 2015.

Hwu et al., "Checkpoint Repair for High-Performance Out-of-Order Execution Machines"., IEEE Transactions on Computers, vol. C-36, No. 12, pp. 1496-1514, Dec. 1987.

Akkary et al.,"An Analysis of a Resource Efficient Checkpoint Architecture", ACM Transactions on Architecture and Code Optimization, vol. 1, No. 4, pp. 418-444, Dec. 2004.

Kruijf et al., "Idempotent Processor Architecture", 44th Annual IEEE/ACM International Symposium on Microarchitecture, 12 pages, Dec. 3-7, 2011.

Mutlu et al., "Runahead Execution: an Effective Alternative to Large Instruction Windows", IEEE MICRO, pp. 20-25, Nov.-Dec. 2003.

Vijayan et al., "Out-of-Order Commit Logic With Precise Exception Handling for Pipelined Processors", School of Computer Science and Engineering, College of Engineering, Anna University, Chennai, India, 5 pages, Oct. 3, 2002.

Moudgill et al., "Register Renaming and Dynamic Speculation: an Alternative Approach", Proceedings of the 26th Annual International Symposium on Microarchitecture, pp. 202-213, Dec. 1-3, 1993.

Chaudhry, S.,"Rock: A Sparc CMT Processor", Sun Microsystems, 25 pages, Aug. 26, 2008.

Chaudhry et al.,"Rock: A High-Performance Sparc CMT Processor", IEEE MICRO, 11 pages, Mar./Apr. 2009.

Mizrahi et al., U.S. Appl. No. 14/690,424 dated Apr. 19, 2015.
Mizrahi et al., U.S. Appl. No. 14/578,516 dated Dec. 22, 2014.
Mizrahi et al., U.S. Appl. No. 14/578,518 dated Dec. 22, 2014.
Mizrahi et al., U.S. Appl. No. 14/673,884 dated Mar. 31, 2015.
Mizrahi et al., U.S. Appl. No. 14/673,889 dated Mar. 31, 2015.

* cited by examiner

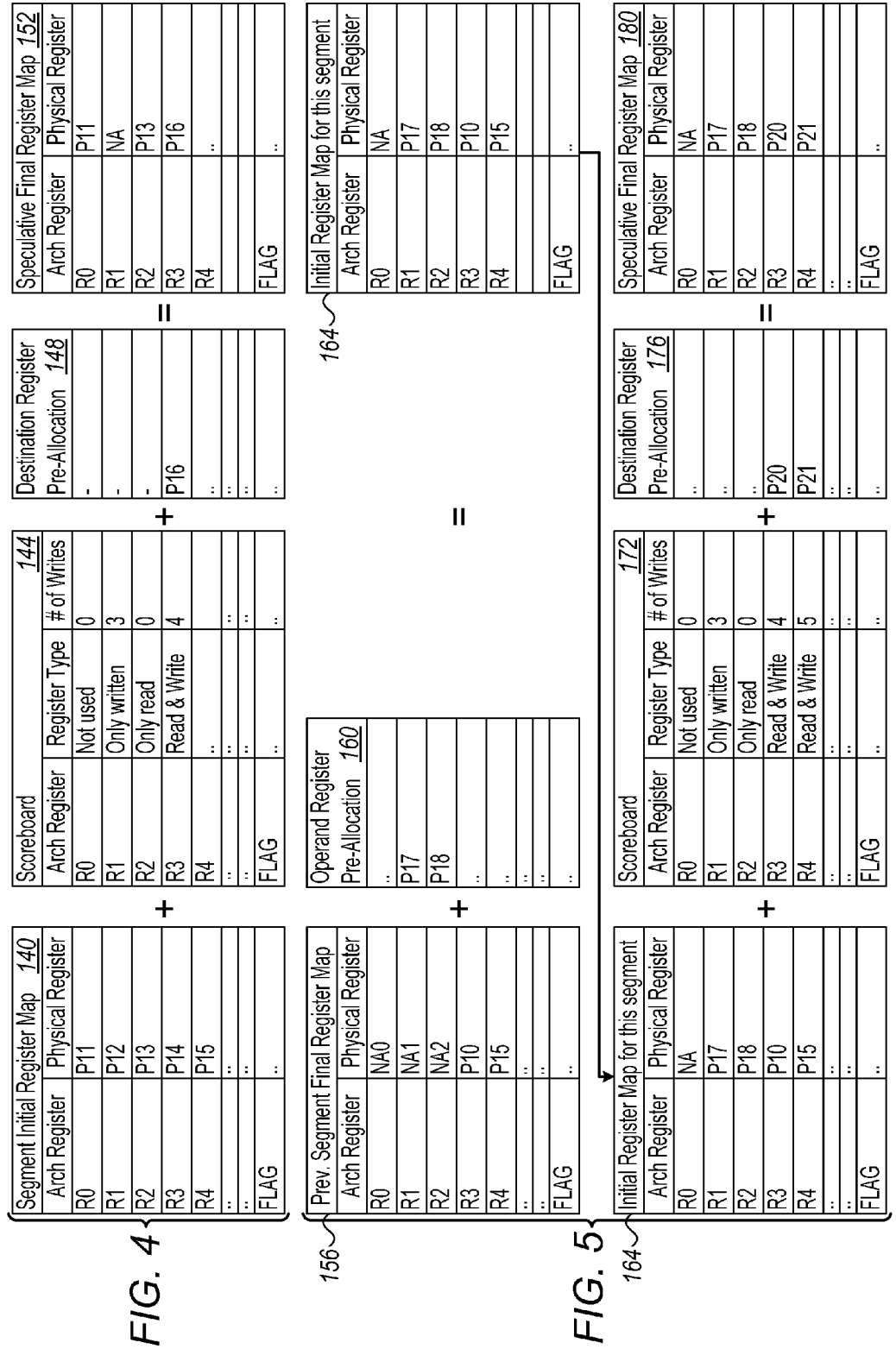

US 9,430,244 B1

RUN-TIME CODE PARALLELIZATION USING OUT-OF-ORDER RENAMING WITH PRE-ALLOCATION OF PHYSICAL REGISTERS

FIELD OF THE INVENTION

The present invention relates generally to processor design, and particularly to methods and systems for run-time code parallelization.

BACKGROUND OF THE INVENTION

Many parallel processors resolve data dependencies by employing register renaming. Various register renaming techniques are known in the art. One fundamental renaming scheme is described by Hennessy and Patterson, in "Computer Architecture—A Quantitative Approach," Fifth edition, Morgan Kaufmann, September, 2011, chapter 3, which is incorporated herein by reference. An overview of known renaming schemes is given, for example, by Sima in "The Design Space for Register Renaming Techniques," IEEE Micro, September, 2000, pages 70-83, which is incorporated herein by reference. Other renaming schemes are described by Monreal et al., in "Dynamic Register Renaming Through Virtual-Physical Registers," Journal of Instruction-Level Parallelism, volume 2, 2000, which is incorporated herein by reference.

SUMMARY OF THE INVENTION

An embodiment of the present invention that is described herein provides a method including processing a sequence of instructions of program code that are specified using one or more architectural registers, by a hardware-implemented pipeline that renames the architectural registers in the instructions so as to produce operations specified using one or more physical registers. At least first and second segments of the sequence of instructions are selected, wherein the second segment occurs later in the sequence than the first segment. One or more of the architectural registers in the instructions of the second segment are renamed, before completing renaming the architectural registers in the instructions of the first segment, by pre-allocating one or more of the physical registers to one or more of the architectural registers.

In some embodiments, pre-allocating the physical registers to the architectural registers is performed before beginning renaming of the architectural registers in the instructions of the first segment. In some embodiments, renaming the architectural registers in the instructions of the second segment is performed independently of renaming the architectural registers in the instructions of the first segment.

In some embodiments, renaming the architectural registers includes identifying a last write instruction to an architectural register in the first segment, and renaming the architectural register in the last write instruction to a physical register that has been pre-allocated. In an embodiment, the method further includes adding to the program code one or more operations that move a result of the last write operation to the pre-allocated physical register.

In some embodiments, pre-allocating the physical registers includes, before completing renaming the architectural registers in the instructions of the first segment, producing an initial architectural-to-physical register mapping for the second segment, and renaming the architectural registers in the instructions of the second segment includes renaming the architectural registers based on the initial architectural-to-physical register mapping.

In an example embodiment, producing the initial architectural-to-physical register mapping for the second segment includes predicting a final architectural-to-physical register mapping that is expected to be produced at an end of the first segment, and deriving the initial architectural-to-physical register mapping for the second segment from the predicted final architectural-to-physical register mapping of the first segment.

In another embodiment, deriving the initial architectural-to-physical register mapping for the second segment includes copying a mapping of at least one architectural register from the predicted final architectural-to-physical register mapping of the first segment to the initial architectural-to-physical register mapping of the second segment.

In some embodiments, predicting the final architectural-to-physical register mapping of the first segment includes selecting at least an architectural register that is predicted to be written-to in the first segment, and determining a final architectural-to-physical register mapping of the at least an architectural register at the end of the first segment. In an example embodiment, selecting at least the architectural register includes choosing the architectural register only if the architectural register is also expected to be read-from in the second segment. In another embodiment, selecting at least the architectural register includes choosing the architectural register if no information is available as to whether the architectural register is expected to be accessed in the second segment.

In yet another embodiment, deriving the initial architectural-to-physical register mapping for the second segment includes selecting at least an architectural register that is predicted to be read-from in the second segment, and mapping the selected architectural register to a new physical register in the initial architectural-to-physical register mapping for the second segment. In still another embodiment, deriving the initial architectural-to-physical register mapping for the second segment includes selecting at least an architectural register that is predicted to be read-from in the second segment but has no mapping available for the second segment, and mapping the selected architectural register to a new physical register in the initial architectural-to-physical register mapping for the second segment.

In an embodiment, predicting the final architectural-to-physical register mapping of the first segment includes defining at least one architectural register in the predicted final architectural-to-physical register mapping as Not Allocated (NA). The architectural register may be defined as NA in response to detecting that only approximate register-access information is available for the architectural register.

In another embodiment, deriving the initial architectural-to-physical register mapping for the second segment includes specifying at least one of the architectural registers as Not Allocated (NA). In yet another embodiment, the first and second segments use separate sets of the physical registers. In still another embodiment, deriving the initial architectural-to-physical register mapping for the second segment includes selecting at least an architectural register that is expected to be read-from in the second segment, and specifying the selected architectural register as Not Allocated (NA).

There is additionally provided, in accordance with an embodiment of the present invention, a processor including a hardware-implemented pipeline and parallelization circuitry. The pipeline is configured to process a sequence of instructions of program code that are specified using one or more architectural registers, including renaming the architectural registers in the instructions so as to produce operations specified using one or more physical registers. The parallelization circuitry is configured to select at least first and second segments of the sequence of instructions, wherein the second segment occurs later in the sequence than the first segment, and to rename one or more of the architectural registers in the instructions of the second segment, before completing renaming the architectural registers in the instructions of the first segment, by pre-allocating one or more of the physical registers to one or more of the architectural registers.

The present invention will be more fully understood from the following detailed description of the embodiments thereof, taken together with the drawings in which:

BRIEF DESCRIPTION OF THE DRAWINGS

FIG. 4 is a diagram that schematically illustrates a process for pre-allocation of physical registers to destination registers, in accordance with an embodiment of the present invention; and FIG. 5 is a diagram that schematically illustrates a process for pre-allocation of physical registers to operand registers, in accordance with an embodiment of the present invention.

DETAILED DESCRIPTION OF EMBODIMENTS

Overview

Figure 1:
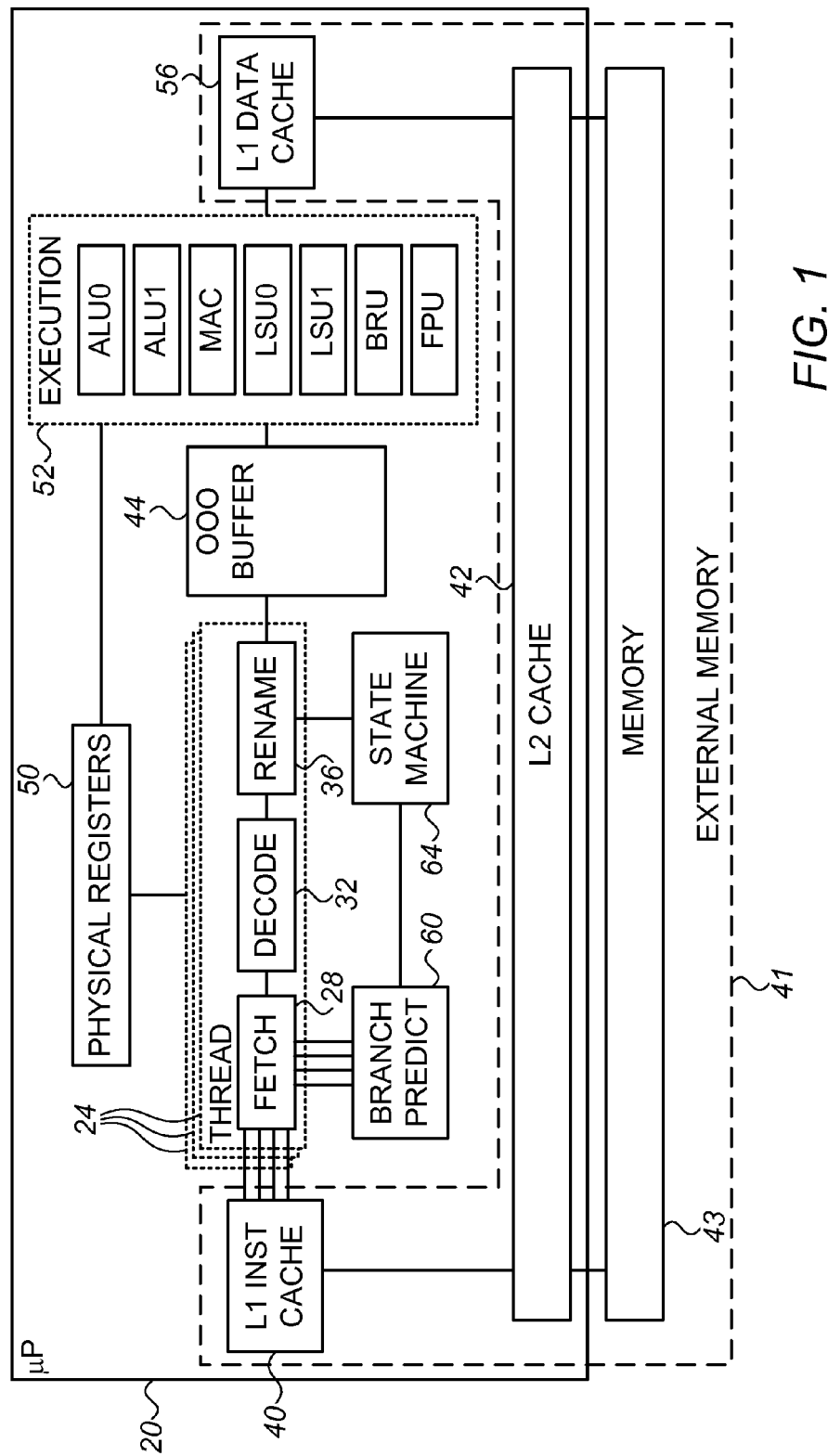
FIG. 1 is a block diagram that schematically illustrates a processor, in accordance with an embodiment of the present invention.

Embodiments of the present invention that are described herein provide improved methods and apparatus for run-time parallelization of program code. In some embodiments, a processor comprises a hardware-implemented pipeline that processes a sequence of instructions. The instructions are specified in terms of one or more architectural registers defined in the Instruction Set Architecture of the processor. Among other functions, the pipeline comprises at least one renaming unit that renames the registers in the instructions, i.e., maps the architectural registers to physical registers of the processor.

In some embodiments the pipeline comprises multiple renaming units that are assigned to rename respective segments of the program code. In the context of the present patent application and in the claims, the terms "segment" refers to any group of one or more instructions that occurs at some location in the program code. Each renaming unit typically outputs a stream of micro-ops or instructions that are specified in terms of one or more of the physical registers. The micro-ops or instructions are buffered and dispatched for execution.

Typically, each renaming unit maintains a register map, which maps one or more of the architectural registers to respective physical registers. The renaming unit uses the register map for translating the input instructions into the output micro-ops. Typically, the renaming unit uses the register map to map operand registers (architectural registers that are read-from) to the appropriate physical registers from which the operands should be read. For each instruction that updates an architectural register, a new physical register is allocated as destination register. The new allocations are updated in the register map, for use when these architectural registers are next used as operands. The renaming unit updates the register map continuously during processing, i.e., allocates physical registers to destination architectural registers updates the register map accordingly.

One of the major challenges in run-time code parallelization is efficient parallelization of register renaming. Consider, for example, a scenario involving first and second code segments, wherein the second segment occurs later in the code than the first segment. A naïve renaming scheme would wait until the first segment is fully renamed, i.e., until the register map reflects the architectural-to-physical register mapping at the end of the first segment, and only then begin renaming the second segment beginning with this register map. Such a solution, as can be appreciated, has poor parallelization performance.

In contrast, embodiments of the present invention enable the pipeline to start renaming the second segment before the first segment is fully renamed. The capability to rename segments out-of-order reduces the probability that renaming units will stall due to unresolved dependencies, and therefore increases parallelization performance considerably.

In some embodiments, when the pipeline begins to rename the first segment, parallelization circuitry in the processor predicts the register map that is expected to be produced by the renaming unit at the end of the first segment. This register map is referred to herein as the speculative final register map of the first segment. From the speculative final register map of the first segment, the parallelization circuitry derives a speculative initial register map for the second segment, and then begins to rename the second segment using the speculative initial map. In this manner, renaming of the second segment begins long before the first segment is fully renamed, i.e., the two segments are renamed at least partially in parallel. The process continues in a similar manner to the next segment, and so on.

In some embodiments, prediction of the speculative final map of the first segment and derivation of the speculative initial map of the second segment involve pre-allocation of physical registers to one or more of the architectural registers. Pre-allocation may be performed, for example, for destination architectural registers in the first segment and/or for architectural registers that serve as operands in the second segment.

Consider, for example, an architectural register that is written-to in instruction X in the first segment and is expected to be read-from in instruction Y in the second segment. In an embodiment, the parallelization circuitry pre-allocates a physical register to this architectural register in the speculative final map of the first segment (i.e., forces the renaming unit to perform the last write to the architectural register in the first segment to that specific pre-allocated physical register). Pre-allocation may also be performed in other ways, for example by inserting additional micro-ops or by changing the operand mapping of the second segment. These actions may be performed either immediately or at a later time in the CPU pipeline, e.g., at the end of the segment.

The parallelization circuitry then uses the speculative final register map of the first segment to create the speculative initial map of the second segment (i.e., the initial register map of the second segment, reflects the predicted location of its operands at the end of the first segment). As a result of this pre-allocation, the data dependency between the first and second segments is handled. Thus, the second segment can be renamed before renaming of the first segment is completed.

Various examples of parallel renaming, including techniques for predicting speculative final register maps and speculative initial register maps, and pre-allocation schemes for destination registers and operands, are described in detail herein.

System Description

FIG. 1 is a block diagram that schematically illustrates a processor 20, in accordance with an embodiment of the present invention. Processor 20 runs pre-compiled software code, while parallelizing the code execution. Instruction parallelization is performed by the processor at run-time, by analyzing the program instructions as they are fetched from memory and processed.

In the present example, processor 20 comprises multiple hardware threads 24 that are configured to operate in parallel. Each thread 24 is configured to process a respective segment of the code. Certain aspects of thread parallelization, including definitions and examples of partially repetitive segments, are addressed, for example, in U.S. patent application Ser. Nos. 14/578,516, 14/578,518, 14/583,119, 14/637,418, 14/673,884, 14/673,889 and 14/690,424, which are all assigned to the assignee of the present patent application and whose disclosures are incorporated herein by reference.

In the present embodiment, each thread 24 comprises a fetching unit 28, a decoding unit 32 and a renaming unit 36. Fetching units 24 fetch the program instructions of their respective code segments from a memory, e.g., from a multi-level instruction cache. In the present example, processor 20 comprises a memory system 41 for storing instructions and data. Memory system 41 comprises a multi-level instruction cache comprising a Level-1 (L1) instruction cache 40 and a Level-2 (L2) cache 42 that cache instructions stored in a memory 43. Decoding units 32 decode the fetched instructions.

Renaming units 36 carry out register renaming. The decoded instructions provided by decoding units 32 are typically specified in terms of architectural registers of the processor's Instruction Set Architecture. Processor 20 comprises a register file 50 that comprises multiple physical registers. The renaming units associate each architectural register in the decoded instructions with a respective physical register in register file 50 (typically allocates new physical registers for destination registers, and maps operands to existing physical registers). In some embodiments, renaming of segments is performed out-of-order, using techniques that are described in detail further below.

The renamed instructions (e.g., the micro-ops output by renaming units 36) are buffered in an Out-of-Order (OOO) buffer 44 for out-of-order execution by multiple execution units 52, i.e., not in the order in which they have been fetched by fetching unit 28.

The renamed instructions buffered in OOO buffer 44 are scheduled for execution by the various execution units 52. Instruction parallelization is typically achieved by issuing multiple (possibly out of order) renamed instructions/micro-ops to the various execution units at the same time. In the present example, execution units 52 comprise two Arithmetic Logic Units (ALU) denoted ALU0 and ALU1, a Multiply-Accumulate (MAC) unit, two Load-Store Units (LSU) denoted LSU0 and LSU1, a Branch execution Unit (BRU) and a Floating-Point Unit (FPU). In alternative embodiments, execution units 52 may comprise any other suitable types of execution units, and/or any other suitable number of execution units of each type. The cascaded structure of threads 24, OOO buffer 44 and execution units 52 is referred to herein as the pipeline of processor 20.

The results produced by execution units 52 are saved in register file 50, and/or stored in memory system 41. In some embodiments the memory system comprises a multi-level data cache that mediates between execution units 52 and memory 43. In the present example, the multi-level data cache comprises a Level-1 (L1) data cache 56 and L2 cache 42.

In some embodiments, the Load-Store Units (LSU) of processor 20 store data in memory system 41 when executing store instructions, and retrieve data from memory system 41 when executing load instructions. The data storage and/or retrieval operations may use the data cache (e.g., L1 cache 56 and L2 cache 42) for reducing memory access latency. In some embodiments, high-level cache (e.g., L2 cache) may be implemented, for example, as separate memory areas in the same physical memory, or simply share the same memory without fixed pre-allocation.

A branch prediction unit 60 predicts branches or flow-control traces (multiple branches in a single prediction), referred to herein as "traces" for brevity, that are expected to be traversed by the program code during execution by the various threads 24. Based on the predictions, branch prediction unit 60 instructs fetching units 28 which new instructions are to be fetched from memory. Branch prediction in this context may predict entire traces for segments or for portions of segments, or predict the outcome of individual branch instructions. When parallelizing the code, e.g., as described in the above-cited patent applications, a state machine unit 64 manages the states of the various threads 24, and invokes threads to execute segments of code as appropriate.

In some embodiments, processor 20 parallelizes the processing of program code among threads 24. Parallelization tasks may be distributed or partitioned among various elements of processor 20. Thus, in the context of the present disclosure and in the claims, units 60, 64, 32 and 36 are referred to collectively as thread parallelization circuitry (or simply parallelization circuitry for brevity). In alternative embodiments, the parallelization circuitry may comprise any other suitable subset of the units in processor 20.

In some embodiments, some or even all of the functionality of the parallelization circuitry may be carried out using run-time software. Such run-time software is typically separate from the software code that is executed by the processor and may run, for example, on a separate processing core.

The configuration of processor 20 shown in FIG. 1 is an example configuration that is chosen purely for the sake of conceptual clarity. In alternative embodiments, any other suitable processor configuration can be used. For example, in the configuration of FIG. 1, multi-threading is implemented using multiple fetching, decoding and renaming units. Additionally or alternatively, multi-threading may be implemented in many other ways, such as using multiple OOO buffers, separate execution units per thread and/or separate register files per thread. In another embodiment, different threads may comprise different respective processing cores.

As yet another example, the processor may be implemented without cache or with a different cache structure, without branch prediction or with a separate branch prediction per thread. The processor may comprise additional elements not shown in the figure. Further alternatively, the disclosed techniques can be carried out with processors having any other suitable micro-architecture.

Processor 20 can be implemented using any suitable hardware, such as using one or more Application-Specific Integrated Circuits (ASICs), Field-Programmable Gate Arrays (FPGAs) or other device types. Additionally or alternatively, certain elements of processor 20 can be implemented using software, or using a combination of hardware and software elements. The instruction and data cache memories can be implemented using any suitable type of memory, such as Random Access Memory (RAM).

Processor 20 may be programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In some embodiments, the parallelization circuitry of processor 20 monitors the code processed by one or more threads 24, identifies code segments that are at least partially repetitive, and parallelizes execution of these code segments. Certain aspects of parallelization functions performed by the parallelization circuitry, including definitions and examples of partially repetitive segments, are addressed, for example, in U.S. patent application Ser. Nos. 14/578,516, 14/578,518, 14/583,119, 14/637,418, 14/673,884, 14/673,889 and 14/690,424, cited above.

Out-of-Order Renaming Using Speculative Register Maps

In some embodiments, the parallelization circuitry in processor 20 selects segments of the program code, and invokes various hardware threads 24 to process the segments at least partially in parallel. In some embodiments, although not necessarily, the segments may be parts of a repetitive instruction sequence, such as loop iterations or portions thereof, or functions or portions thereof. Generally, however, the parallelization circuitry may select any suitable segments of code for parallelization.

Consider a certain hardware thread 24 that processes a certain code segment. In this thread, renaming unit 36 typically receives from decoding unit 32 a stream of decoded instructions. The decoded instructions are specified in terms of architectural registers that are defined in the Instruction Set Architecture of the processor. In the description that follows, the architectural registers are denoted {r1, r2, r3, . . . }. The architectural registers are also referred to as logical registers, since they are not associated with any fixed physical memory location.

Renaming unit 36 maps the architectural registers to physical registers 50 of the processor. In the description that follows, the physical registers are denoted {p1, p2, p3, . . . }. In an example embodiment, the Instruction Set Architecture of processor 20 supports sixteen architectural registers {r0 . . . r15} and 128 physical registers {p0 . . . p127}. Alternatively, however, any other suitable numbers of architectural and physical registers can be used. Each physical register corresponds to a respective physical storage location in which a value can be stored or loaded from. The terms "mapping architectural registers to physical registers," "allocating physical registers to architectural registers" and "register renaming" refer to the same operation and are used interchangeably herein. Renaming of registers in the instructions of a given segment is also referred to herein as "renaming a segment" for brevity.

At any given time, the renaming unit holds an architectural-to-physical register mapping that maps one or more of the architectural registers to one or more respective physical registers. The renaming unit applies the mapping to the incoming stream of decoded instructions, and outputs a stream of operations (e.g., micro-ops or instructions) in which the architectural registers have been renamed to the physical registers. In a typical embodiment, the micro-ops are created in decoding unit 32, and renaming unit 36 renames the architectural registers in the micro-ops to the appropriate physical registers and outputs the resulting micro-ops. The operations output by unit 36 are buffered in OOO buffer 44 and eventually dispatched for execution in the various execution units 52.

The architectural-to-physical register mapping is referred to herein simply as a register map, for brevity. The renaming unit typically updates the register map continuously during processing of the segment. The renaming unit typically allocates physical registers to destination architectural registers (registers that are written-to), and updates the register map accordingly by changing the mapping of the architectural register to a new allocated physical register. Furthermore, for every instruction that comes along with specific architectural registers as operands, using this map, the renaming unit is aware of which physical registers should be read.

The register map at the beginning of a segment is referred to herein as an initial map, and the register map at the end of a segment is referred to as a final map.

One of the challenges in code parallelization is to parallelize the operation of renaming units 36 by resolving data dependencies between segments. For example, if an architectural register written-to in a first segment is read-from as an operand by an instruction in a subsequent second segment, then the second segment should be aware of the physical register in which this value is stored at the end of the first segment. A possible solution would be to wait until the renaming in the first segment is complete (i.e. until the final register map of the first segment is complete) and only then start renaming the second segment (with the initial register map of the second segment being derived from the final register map of the first segment). This solution essentially means that the renaming of the segments is performed one after another. This sort of solution, which could be performed by a single renamer, would degrade parallelization performance considerably.

Another possible solution may comprise, for example, proceeding with renaming the second segment until the renaming unit needs an operand for which it is unaware of an associated physical register, and then stalling renaming the second segment until the end of the first segment (at which point the physical register associated with the operand is known). Yet another possible solution may comprise proceeding with renaming the second segment until the renaming unit needs an operand for which it is unaware of an associated physical register, continuing the renaming process without assigning a physical register to the operand. Later on, when the physical register becomes known, an update can be made in the appropriate instructions or micro-ops in the ROB or schedulers.

In some embodiments of the present invention, the parallelization circuitry performs such coordination between segments while allowing the renaming units to operate out-of-order, i.e., to start renaming registers in a certain segment before the renaming of the preceding segment is complete. As a result, the renaming units are less likely to stall (and cause subsequent operations to stall) due to unresolved dependencies.

The description that follows refers to a first segment and a second segment of the code. The second segment occurs later in the code than the first segment. Nevertheless, the parallelization circuitry enables the renaming units to rename one or more of the instructions of the second segment, before the renaming of all the instructions of the second segment is completed. In an embodiment, register renaming in the first and second segments is carried out by different renaming units 36 in different hardware threads 24. For the sake of clarity, the description that follows refers to the various renaming units collectively.

Figure 2:
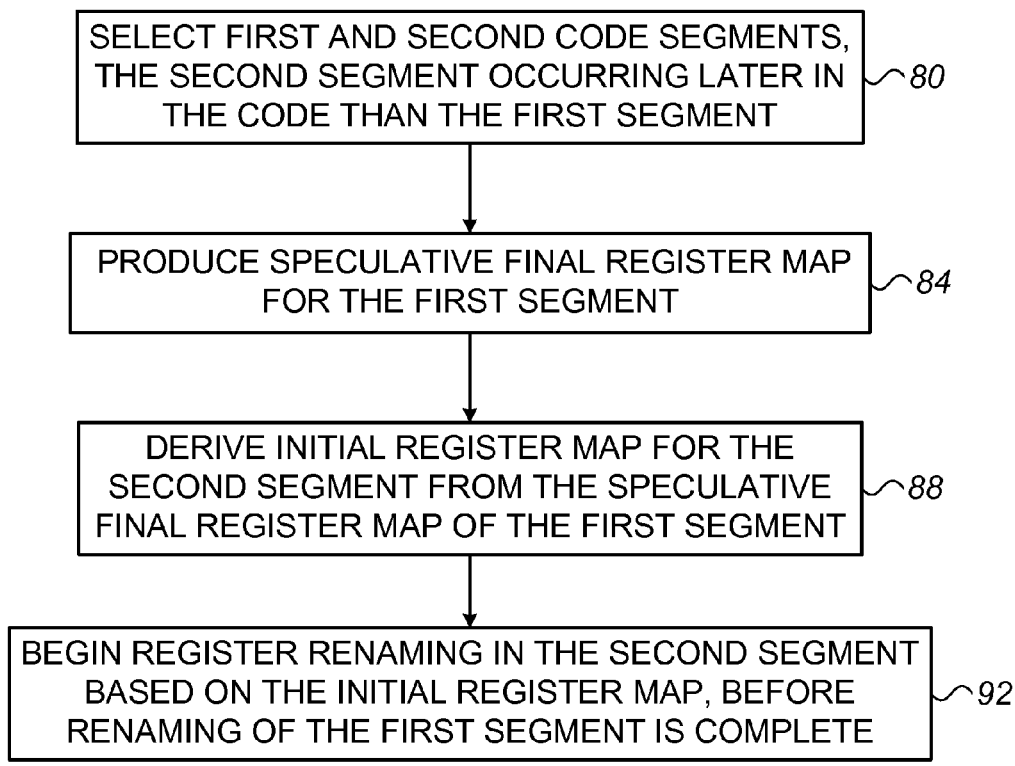
FIG. 2 is a flow chart that schematically illustrates a method for register renaming, in accordance with an embodiment of the present invention.

FIG. 2 is a flow chart that schematically illustrates a method for register renaming, in accordance with an embodiment of the present invention. The method begins with the parallelization circuitry selecting a first segment, and a second segment that occurs later in the code than the first segment, at a segment selection step 80.

At a final map creation step 84, the parallelization circuitry predicts the final register map that is expected to be produced by the renaming unit at the end of the first segment. This predicted register map is referred to herein as a speculative final map.

The parallelization circuitry typically predicts the speculative final map immediately after creating the initial map, or alternatively at any other suitable time. For example, the parallelization circuitry may invoke a thread 24 to process the first segment, and as part of the invocation provide the thread with both the initial map and the speculative final map of the segment. Generally, however, the speculative final map of the first segment may be produced at any suitable time before renaming of the first segment is complete. The speculative final map of the first segment may comprise any suitable number of entries that map one or more architectural registers to one or more respective physical registers.

The parallelization circuitry then derives an initial register map for the second segment from the speculative final register map of the first segment, at a derivation step 88. The initial map of the second segment may comprise any suitable number of entries that map one or more architectural registers to one or more respective physical registers.

One or more of the entries may be copied without change from the speculative final map of the first segment. One or more of the entries may be modified relative to the speculative final map of the first segment. One or more of the entries may be new, i.e., allocate physical registers to architectural registers that are not specified in the speculative final map of the first segment. Example techniques for deriving the initial register map of the second segment are described further below.

At a renaming step 92, the renaming unit begins to rename the registers in the second segment, starting from the initial register map derived at step 88. Renaming of the second segment begins before the renaming of the first segment is completed. In some embodiments, renaming of the second segment may begin even before beginning to rename the first segment.

Predicting the Speculative Register Map of the First Segment, and Deriving the Initial Register Map of the Second Segment In some embodiments, the parallelization circuitry predicts the speculative register map of the first segment, and derives the initial register map of the second segment, based on register-access information that is monitored and recorded for the two segments. The register-access information is referred to herein as a scoreboard. Construction and usage of scoreboards for parallelization are addressed, for example, in U.S. patent application Ser. Nos. 14/578,516, 14/578,518, 14/583,119, 14/637,418, 14/673,884 and 14/690,424, which are all assigned to the assignee of the present patent application and whose disclosures are incorporated herein by reference.

The parallelization circuitry typically constructs one or more scoreboards by monitoring the instructions as they are processed by the processor. Each segment is thus associated with a scoreboard that specifies how the architectural registers are accessed during that segment. Typically, although not necessarily, the scoreboard is associated with a particular flow-control trace, i.e., with a particular flow-control path traversed by the instructions.

The scoreboard associated with a segment may comprise various types of information relating to register access by the instructions of the segment. The description that follows refers mainly to two types of information—Register classification and Last-Write Indication (LWI).

In some embodiments, as part of constructing the scoreboard of a segment, the parallelization circuitry classifies each architectural register as Global (G), Local (L) or Global-Local (GL), and indicates the classification in the scoreboard. In some embodiments this classification is also performed and recorded for the processor flags. The description that follows focuses on registers, for clarity, but the disclosed techniques can be applied to flags, as well. The classification of a register as G, L or GL depends on the order in which the register is used as an operand (whose value is read) and/or as a destination (to which a value is written) in the segment.

In an embodiment, a local (L) register is defined as a register whose first occurrence in the segment is as a destination (subsequent occurrences, if any, may be as operand and/or destination). A Global (G) register is defined as a register that is used in the segment only as an operand, i.e., the register is read but never written to. A global-local (GL) register is defined as a register whose first occurrence in the segment is as an operand, and is later used in the segment as a destination. The first and subsequent occurrences may occur in different instructions or in the same instruction, as long as the order between "first" and "subsequent" is preserved.

In addition, for one or more of the registers, the parallelization circuitry specifies in the scoreboard the location in the segment of the last write operation to the register. This indication is referred to herein as a Last-Write Indication (LWI). Any suitable indication may be used to indicate the location of the last write operation, such as a count of the number of writes to the register or the address of the last write operation. The description that follows refers mainly to the number of writes, and the terms "LWI of a register in a segment" and "number of writes to a register in a segment" are used interchangeably herein.

In some embodiments, the parallelization circuitry predicts the speculative final map of the first segment by:

Selecting one or more destination registers, i.e., one or more architectural registers that are expected to be written to during the first segment. The identification of destination registers is made using the register classification specified in the scoreboard associated with the first segment—Architectural registers that are expected to be written to are classified as L or GL. The selection of which destination registers are to be pre-allocated physical registers may depend on their (known or predicted) usage as operands in the second segment.

Allocating, in the speculative final map of the first segment, new physical registers for the selected destination registers. Note that this allocation is typically performed before the instructions having the selected destination registers arrive in the renaming unit.

When renaming the first segment, the renaming unit receives one or more last-write indication from the parallelization circuitry. Based on these indications the renaming unit ensures that the last write operation to each of the selected destination registers is performed to the respective physical registers specified in the speculative final map of the first segment. In other words, when processing the last write instruction to a selected destination register in the first segment, the renaming unit renames this destination register to the respective new physical register that is specified in the speculative final map of the first segment (and does not simply pick an arbitrary physical register). The last-write instructions to the various destination registers are identified using the LWIs specified in the scoreboard associated with the first segment.

In some embodiments, the parallelization circuitry may add to the program code one or more micro-ops (or other instructions) that move the result of the last write operation in the first segment to the appropriate physical location (to the physical register pre-allocated in the second segment). As will be explained in detail below, the result of the last write operation in the first segment and the pre-allocated physical register in the second segment may be located in the same register file or in different register files.

In some embodiments, the parallelization circuitry derives the initial register map of the second segment by copying the above-described mappings of the selected destination registers from the speculative final map of the first segment to the initial register map of the second segment.

This initial register map typically reflects the register architectural state as if the first segment has been entirely processed by the renaming unit. In other words, the operand location seen by the second segment reflects the register updates that were done by the first segment.

It is emphasized that this coordination is typically created before the first segment is fully renamed (because it is based on the speculative final map of the first segment that is typically produced when beginning to rename the first segment) and may actually be performed even before renaming of the first segment starts.

In various embodiments, the parallelization circuitry may coordinate the physical registers between the first and second segments, as described above, for various subsets of the destination registers appearing in the first segment. In one embodiment, coordination is performed for all destination registers appearing in the first segment (i.e., for all the architectural registers that are classified as L or GL in the scoreboard of the first segment).

Thus, in another embodiment, coordination is performed only for destination registers that are classified as GL (but not L) in the scoreboard of the first segment. In an alternative embodiment, coordination is performed for destination registers that are classified as L (but not GL) in the scoreboard of the first segment. Alternatively, other partitions of the destination registers may be used in order to decide when to use such coordination. For other destination registers, no physical register is pre-allocated.

In yet another embodiment, coordination is performed for a destination register appearing in the first segment, only if this register is expected to be accessed in the second segment. This information can be obtained from the scoreboard of the second segment, if available (or predicted). If the scoreboard of the second segment (or a prediction thereof) is not available, the parallelization circuitry may decide to perform the above coordination for all destination registers. The same decision can be taken if all destination registers appearing in the first segment are expected (or at least predicted) to be accessed in the second segment. This decision is typically made per register.

In some embodiments, for architectural registers that are only read in the first segment (i.e., classified as G in the scoreboard of the first segment), the parallelization circuitry copies the existing allocation of physical register from the initial map of the first segment to the initial map of the second segment.

In some embodiments, the register-access information used for the above technique is approximate rather than exact. For example, the register-access information in the scoreboard may specify which registers are not written-to in the first segment and which registers are written-to in the first segment (without specifying the number of writes for each register or where the last write occurs). Another example for approximate register-access information is when the number of writes specified in the scoreboard is larger than the writes that would occur for one of the specific flow-control traces. The construction and usage of approximate scoreboard is addressed, for example, in U.S. patent application Ser. Nos. 14/637,418 and 14/690,424, cited above.

In some embodiments, the first and second segments share the same physical register file (or otherwise share the same set of physical registers), and the speculative final register map of the first segment does not specify "Not Allocated" (NA) for registers which are needed in the second segment (G and GL). In such embodiments, the initial register map of the second segment will automatically reflect any pre-allocation of physical registers to destination registers in the speculative final map of the first segment.

Alternatively, if the final register map of the first segment does specify NA for registers which are needed in the second segment, then the initial register map of the second segment may pre-allocate free physical registers to operands which are needed in the second segment and are not available in the final register map of the first segment. Alternatively, the initial register map of the second segment may not pre-allocate free physical registers to operands which are needed in the second segment and are not available in the final register map of the first segment. In the latter case, when an instruction with an unallocated operand arrives to the renaming unit, the renaming unit may stall until receiving the needed information.

In alternative embodiments, the first and second segments may use separate physical register files. In this case, the first segment cannot write directly to registers which can be read directly by the second segment. In these cases the initial register map of the second segment will pre-allocate free physical registers (from its register file) to operands which are needed in the second segment and are written to in the first segment (whether their number of writes is known or not since they are written in another register file).

In some embodiments, the speculative final map of the first segment, and the initial map of the second segment derived therefrom, are full, i.e., contain all the architectural registers appearing in the first and second segments. In such a case, the renaming unit is free to proceed and rename the second segment as soon as the initial map of the second segment has been derived.

In alternative embodiments, the register maps may be incomplete, i.e., the initial map of the second segment may be missing an allocation of physical registers for one or more of the architectural registers appearing in the second segment. Such a missing allocation is denoted "NA". In an embodiment, the renaming unit begins to rename the second segment even if the initial map of the second segment is incomplete. The renaming process may proceed without halting the renaming unit, until encountering an instruction containing an architectural register that is not yet mapped to any physical register.

In alternative embodiments, the parallelization circuitry may update the map of the second segment once the NA is resolved (i.e., the physical location of a register becomes known). Two cases should be considered. In the first case the resolution of the NA occurs prior to the decoding of the instruction in the second segment in which the specific register is used as an operand. (In this case there is no problem and the renaming unit handling the second segment can continue working). In the second case the renaming unit encounters an operand for which there is NA. This case has two solutions: The renaming unit may either stall renaming of the second segment, or let the instruction/micro-op continue in the pipeline without specifying the location of the physical register of the operand. Once the physical location is known, the renaming unit may update the relevant instruction in the ROB or scheduler.

Example Method Flow and Renaming Processes

Figure 3:
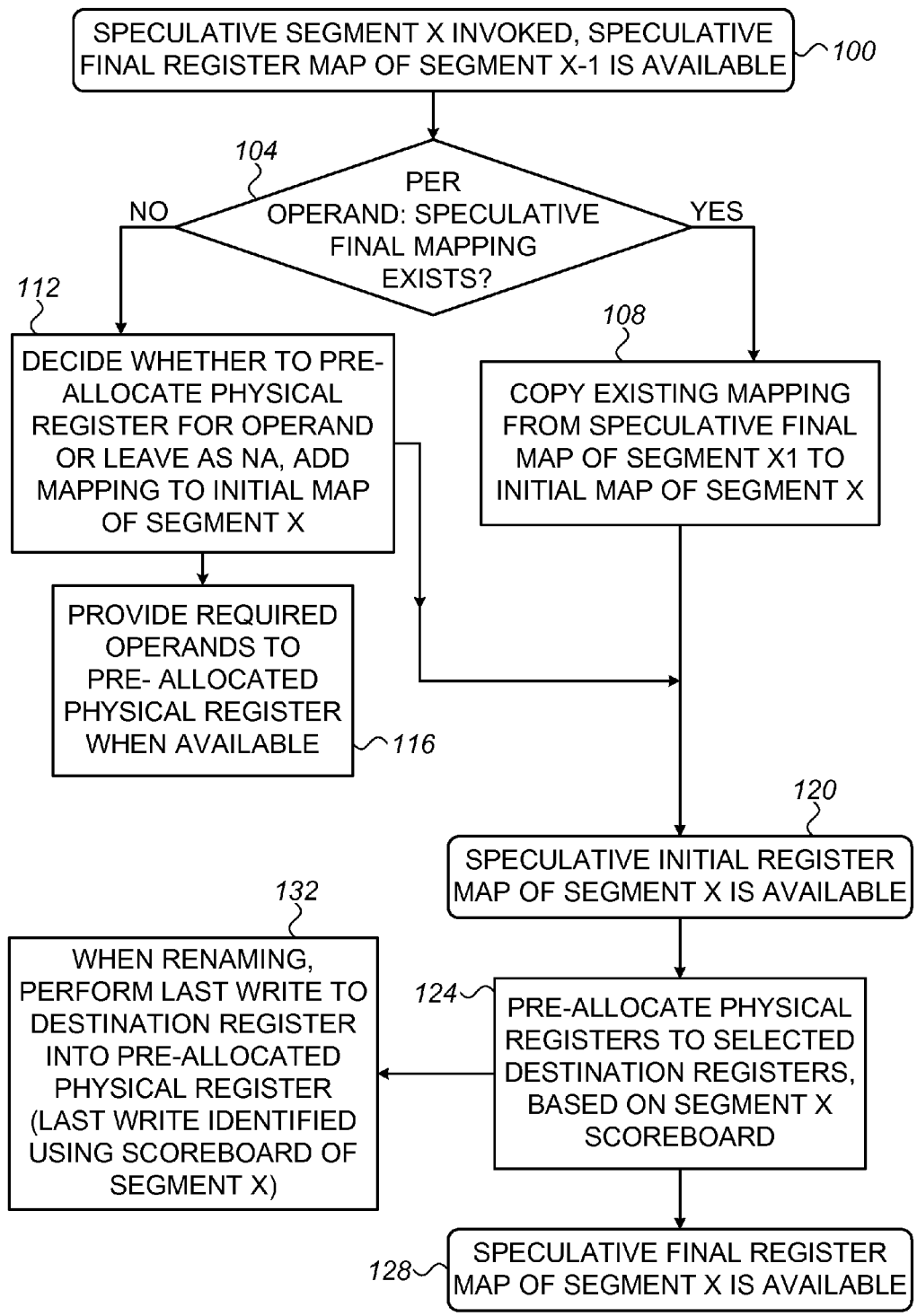
FIG. 3 is a flow chart that schematically illustrates a method for register pre-allocation, in accordance with an embodiment of the present invention.

FIG. 3 is a flow chart that schematically illustrates a method for register pre-allocation, in accordance with an embodiment of the present invention. The method has two parts: Steps 100-116 describe a process of deriving the initial register map of a segment (denoted segment X) from the speculative final map of the previous segment (denoted segment X−1). Steps 120-132 describe a process of predicting the speculative final map of segment X from the initial map of segment X. The method of FIG. 3 may be carried out repeatedly, so as to parallelize renaming of multiple segments.

The method begins with the parallelization circuitry of processor 20 invoking a certain hardware thread 24 to process segment X, at an invocation step 100. The speculative final register map of segment X−1 is available at invocation time. As explained above, segment X−1 may not be fully renamed at this stage.

At a checking step 104, the parallelization circuitry checks, per operand (e.g., per architectural register that will be read from during segment X, or for all registers as stated above), whether a final mapping is available for this architectural register in the speculative final register map of segment X−1. If available and the two segments share the register file (or not available and not needed), the parallelization circuitry copies the existing mapping from the speculative final register map of segment X−1 to the initial mapping of segment X, at a copying step 108.

If a final mapping is not available, or if the two segments do not share the same register file (or otherwise use different sets of physical registers), the parallelization circuitry may choose to pre-allocate a new physical register to the operand in question, and add this allocation to the initial mapping of segment X, at an operand pre-allocation step 112. Alternatively, the parallelization circuitry may choose to leave the operand unavailable (in which case, if the renaming unit gets to this instruction it will halt until notified of the location of the operand). When a value of the operand becomes available, the parallelization circuitry makes the value available to the pre-allocated physical register, at a value provisioning step 116.

The process of steps 104-116 is repeated per operand (e.g., per architectural register that will be read from during segment X, or for any subset of registers). The process ends at an interim step 120, in which the (speculative) initial map of segment X is available.

The parallelization circuitry then proceeds to predict the speculative final map of segment X from the speculative initial map of segment X. At a destination pre-allocation step 124, the parallelization circuitry allocates respective physical registers to one or more selected destination registers, i.e., to one or more architectural registers that are expected to be written to during segment X. Selecting the architectural registers to which physical registers will be pre-allocated for the final destination, may or may not depend on the predicted usage of the registers in the future. At a termination step 128, the speculative final map of segment X is available.

When renaming, at a renaming step 132, the renaming unit guarantees that the last write to each of the selected destination registers is mapped into the respective physical registers that were pre-allocated at step 124.

FIG. 4 is a diagram that schematically illustrates a process for pre-allocation of physical registers to destination registers, in accordance with an embodiment of the present invention. FIG. 4 shows how the parallelization circuitry of processor 20 predicts a speculative final register map 152 for a code segment, based on an initial register map 140 of the same segment. As explained above, speculative final map 152 is predicted based on initial map 140, a scoreboard 144 of the segment, and a destination register pre-allocation 148. Scoreboard 144 may be exact or approximate.

In the present example, scoreboard 144 indicates that architectural register R0 is not used in the segment. Therefore, the mapping of this register (to physical register P11) is copied from map 140 to map 152.

Also in the present example, register R1 is not allocated any physical register in final map 152, and the entry of this register in map 152 is left as Not Allocated (NA). This lack of allocation may be due, for example, to a prediction that this register will not be read by the following segments. Another reason for not allocating a physical register in final map 152 could be that the number of writes to R1 is unknown.

Register R2 is specified in scoreboard 144 as "only read" (i.e., classified as Global—G). As such, the mapping of this register (to physical register P13) is copied as-is from map 140 to map 152. Register R3 is specified in scoreboard 144 as "read and written" (i.e., classified as Global-Local—GL). Therefore, the parallelization circuitry pre-allocates a new physical register (P16) to this register in pre-allocation 148. This pre-allocation is copied to final map 152.

FIG. 5 is a diagram that schematically illustrates a process for pre-allocation of physical registers to both operands and to destination registers, in accordance with an embodiment of the present invention. The top of FIG. 5 shows how the parallelization circuitry derives a speculative initial register map 164 for a code segment based on a predicted speculative final register map 156 of a previous code segment, and on an operand pre-allocation 160.

In the present example, final map 156 of the previous segment is incomplete—The entries of architectural registers R0, R1 and R2 are not available and marked NA0, NA1 and NA2, respectively. In other words, the physical registers allocated to architectural registers R0, R1 and R2 at the end of the renaming of the previous segment is unknown. The missing allocations in map 156 may be due to various reasons. For example, R0 may not be mapped to any physical register because it was predicted not to be read by the following segment.

As another example, R1 may not be mapped because the previous segment producing this operand does not share the same physical register file with the current segment. R2 may not be mapped because the scoreboard for this register (in the previous segment) is approximate, and therefore cannot pre-allocate the final physical location of destination registers. These scenarios, however, are given purely by way of example, and various other scenarios are possible.

For one or more of the operands for which no physical register is allocated in final map 156 of the previous segment, the parallelization circuitry may pre-allocate a new physical register to that operand when deriving the initial map for the current segment. In the example of FIG. 5, registers R1 and R2 are pre-allocated physical registers P17 and P18, respectively, in operand pre-allocation 160. This pre-allocation is copied to initial map 164 of the current segment.

Note that operand pre-allocation is not performed for register R0, even though it is not mapped to any physical register in map 156. Register R0 is thus permitted to remain defined as NA in initial map 164 of the current segment. As explained above, in an embodiment, the renaming unit may still proceed with renaming the current segment, and halt only if encounters an instruction that reads R0 until the value of R0 becomes available.

Further note that if segment X and X−1 do not share the same register file then the operand register pre-allocation 160 contains physical registers (P17, P18) which may be accessed directly only by segment X (and not directly by segment X−1). In this case, operand register pre-allocation 160 may also include physical registers for R3 and R4, and in initial register map 164 physical registers P10 (R3) and P15 (R4) may not be copied from final register map 154 and should be allocated with other physical registers or not allocated (NA).

The bottom of FIG. 5 shows how the parallelization circuitry uses initial map 164 to predict a speculative final register map 180 for this segment. This process uses a scoreboard 172 of the current segment and a destination pre-allocation 176, similarly to the process of FIG. 4 above. This process may take into account the scoreboard of the future predicted segment.

Although the embodiments described herein refer mainly to a first segment and a second segment, the disclosed techniques can be used for out-of-order renaming of any desired number of segments. For example, segment #8 can be renamed before segment #5, and generally each of segments #5-#8 can be renamed in any order.

In alternative embodiments, pre-allocation may not necessarily be performed using the physical registers themselves, but using a third virtual entity to coordinate between the segments.

The disclosed techniques do not depend on any particular register-file structure or any particular renaming scheme. On the contrary, the disclosed techniques can be carried out in conjunction with any type of register file and any renaming scheme. Example renaming schemes that can be adapted with the disclosed techniques are described, for example, in the article "The Design Space for Register Renaming Techniques," cited above.

Moreover, the disclosed techniques are agnostic to the location in the processor pipeline in which the different steps are taken.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
processing a sequence of instructions of program code that are specified using one or more architectural registers, by a hardware-implemented pipeline that renames the architectural registers in the instructions so as to produce operations specified using one or more physical registers;
selecting at least first and second segments of the sequence of instructions, wherein the second segment occurs later in the sequence than the first segment; and
renaming one or more of the architectural registers in the instructions of the second segment, before completing renaming the architectural registers in the instructions of the first segment, by:
identifying an architectural register that is written-to by the instructions of the first segment;
when renaming the first segment, forcing a last write operation to the identified architectural register in the first segment to be mapped to a given physical register; and
when renaming the second segment, before completing the renaming in the first segment, forcing a first readout operation from the identified architectural register in the second segment to be mapped to the same given physical register.

2. The method according to claim 1, wherein renaming the architectural registers in the instructions of the second segment is performed independently of renaming the architectural registers in the instructions of the first segment.

3. The method according to claim 1, wherein forcing the last write operation comprises adding to the program code one or more operations that move a result of the last write operation to the given physical register.

4. The method according to claim 1, wherein renaming the architectural registers comprises, before completing renaming the architectural registers in the instructions of the first segment, producing an initial architectural-to-physical register mapping for the second segment, and renaming the architectural registers in the instructions of the second segment based on the initial architectural-to-physical register mapping.

5. The method according to claim 4, wherein producing the initial architectural-to-physical register mapping for the second segment comprises predicting a final architectural-to-physical register mapping that is expected to be produced at an end of the first segment, and deriving the initial architectural-to-physical register mapping for the second segment from the predicted final architectural-to-physical register mapping of the first segment.

6. The method according to claim 5, wherein deriving the initial architectural-to-physical register mapping for the second segment comprises copying a mapping of at least one architectural register from the predicted final architectural-to-physical register mapping of the first segment to the initial architectural-to-physical register mapping of the second segment.

7. The method according to claim 5, wherein predicting the final architectural-to-physical register mapping of the first segment comprises selecting at least an architectural register that is predicted to be written-to in the first segment, and determining a final architectural-to-physical register mapping of the at least an architectural register at the end of the first segment.

8. The method according to claim 7, wherein selecting at least the architectural register comprises choosing the architectural register only if the architectural register is also expected to be read-from in the second segment.

9. The method according to claim 7, wherein selecting at least the architectural register comprises choosing the architectural register if no information is available as to whether the architectural register is expected to be accessed in the second segment.

10. The method according to claim 5, wherein deriving the initial architectural-to-physical register mapping for the second segment comprises selecting at least an architectural register that is predicted to be read-from in the second segment, and mapping the selected architectural register to a new physical register in the initial architectural-to-physical register mapping for the second segment.

11. The method according to claim 5, wherein deriving the initial architectural-to-physical register mapping for the second segment comprises selecting at least an architectural register that is predicted to be read-from in the second segment but has no mapping available for the second segment, and mapping the selected architectural register to a new physical register in the initial architectural-to-physical register mapping for the second segment.

12. The method according to claim 5, wherein predicting the final architectural-to-physical register mapping of the first segment comprises defining at least one architectural register in the predicted final architectural-to-physical register mapping as Not Allocated (NA).

13. The method according to claim 12, wherein the architectural register is defined as NA in response to detecting that only approximate register-access information is available for the architectural register.

14. The method according to claim 5, wherein deriving the initial architectural-to-physical register mapping for the second segment comprises specifying at least one of the architectural registers as Not Allocated (NA).

15. The method according to claim 5, wherein the first and second segments use separate sets of the physical registers.

16. The method according to claim 5, wherein deriving the initial architectural-to-physical register mapping for the second segment comprises selecting at least an architectural register that is expected to be read-from in the second segment, and specifying the selected architectural register as Not Allocated (NA).

17. A processor, comprising:
a hardware-implemented pipeline, configured to process a sequence of instructions of program code that are specified using one or more architectural registers, including renaming the architectural registers in the instructions so as to produce operations specified using one or more physical registers; and
parallelization circuitry, configured to select at least first and second segments of the sequence of instructions, wherein the second segment occurs later in the sequence than the first segment, and to rename one or more of the architectural registers in the instructions of the second segment, before completing renaming the architectural registers in the instructions of the first segment, by:
identifying an architectural register that is written-to by the instructions of the first segment;
when renaming the first segment, forcing a last write operation to the identified architectural register in the first segment to be mapped to a given physical register; and
when renaming the second segment, before completing the renaming in the first segment, forcing a first readout operation from the identified architectural register in the second segment to be mapped to the same given physical register.

18. The processor according to claim 17, wherein the parallelization circuitry is configured to rename the architectural registers in the instructions of the second segment independently of renaming the architectural registers in the instructions of the first segment.

19. The processor according to claim 17, wherein the parallelization circuitry is configured to produce an initial architectural-to-physical register mapping for the second segment before completing renaming the architectural registers in the instructions of the first segment, and to rename the architectural registers in the instructions of the second segment based on the initial architectural-to-physical register mapping.

20. The processor according to claim 19, wherein the parallelization circuitry is configured to predict a final architectural-to-physical register mapping that is expected to be produced at an end of the first segment, and to derive the initial architectural-to-physical register mapping for the second segment from the predicted final architectural-to-physical register mapping of the first segment.

21. The processor according to claim 20, wherein the parallelization circuitry is configured to derive the initial architectural-to-physical register mapping for the second segment by copying a mapping of at least one architectural register from the predicted final architectural-to-physical register mapping of the first segment to the initial architectural-to-physical register mapping of the second segment.

22. The processor according to claim 20, wherein the parallelization circuitry is configured to select at least an architectural register that is predicted to be written-to in the first segment, and to determine a final architectural-to-physical register mapping of the at least an architectural register at the end of the first segment.

23. The processor according to claim 20, wherein the parallelization circuitry is configured to select at least an architectural register that is predicted to be read-from in the second segment, and to map the selected architectural register to a new physical register in the initial architectural-to-physical register mapping for the second segment.

24. The processor according to claim 20, wherein the parallelization circuitry is configured to select at least an architectural register that is predicted to be read-from in the second segment but has no mapping available for the second segment, and to map the selected architectural register to a new physical register in the initial architectural-to-physical register mapping for the second segment.

25. The processor according to claim 20, wherein the parallelization circuitry is configured to define at least one architectural register in the predicted final architectural-to-physical register mapping as Not Allocated (NA).

26. The processor according to claim 20, wherein the parallelization circuitry is configured to derive the initial architectural-to-physical register mapping for the second segment by specifying at least one of the architectural registers as Not Allocated (NA).

27. The method according to claim 1, wherein forcing the last write operation comprises pre-allocating the given physical register, and instructing a renaming unit in the pipeline to map the last write operation to the pre-allocated given physical register.

28. The processor according to claim 17, wherein the parallelization circuitry is configured to force the last write operation by pre-allocating the given physical register, and instructing a renaming unit in the pipeline to map the last write operation to the pre-allocated given physical register.

* * * * *